(12) United States Patent
Andringa et al.

(10) Patent No.: US 12,459,341 B2
(45) Date of Patent: *Nov. 4, 2025

(54) VEHICLE WITH E-AXLE

(71) Applicant: Oshkosh Corporation, Oshkosh, WI (US)

(72) Inventors: Jeremy Andringa, Oshkosh, WI (US); Mitchel Nordahl, Oshkosh, WI (US)

(73) Assignee: OSHKOSH CORPORATION, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/671,549

(22) Filed: May 22, 2024

(65) Prior Publication Data

US 2024/0308320 A1 Sep. 19, 2024

Related U.S. Application Data

(63) Continuation of application No. 17/514,540, filed on Oct. 29, 2021, now Pat. No. 12,017,521.

(60) Provisional application No. 63/107,581, filed on Oct. 30, 2020.

(51) Int. Cl.

| | |
|---|---|
| *B60K 1/02* | (2006.01) |
| *B60K 17/28* | (2006.01) |
| *B60K 25/06* | (2006.01) |
| *B60L 50/16* | (2019.01) |
| *B60K 1/00* | (2006.01) |
| *B60K 25/00* | (2006.01) |
| *B60P 3/16* | (2006.01) |

(52) U.S. Cl.
CPC ............... *B60K 1/02* (2013.01); *B60K 17/28* (2013.01); *B60K 25/06* (2013.01); *B60L 50/16* (2019.02); *B60K 2001/001* (2013.01); *B60K 2025/005* (2013.01); *B60P 3/16* (2013.01)

(58) Field of Classification Search
CPC .......... B60K 1/02; B60K 17/28; B60K 25/06; B60K 2001/001; B60K 2025/005; B60L 50/16; B60P 3/16
See application file for complete search history.

(56) References Cited

U.S. PATENT DOCUMENTS

| | | | | |
|---|---|---|---|---|
| 7,520,354 | B2 * | 4/2009 | Morrow | ................ B60K 6/365 180/271 |
| 9,493,093 | B2 | 11/2016 | Stingle et al. | |
| 10,953,939 | B2 | 3/2021 | Zuleger et al. | |
| 11,186,008 | B2 | 11/2021 | Steffens et al. | |
| 11,186,009 | B2 | 11/2021 | Bjornstad et al. | |
| 11,186,010 | B2 | 11/2021 | Andringa et al. | |
| 11,187,138 | B2 | 11/2021 | Steffens et al. | |
| 11,225,240 | B2 * | 1/2022 | Dalum | ................ B60K 25/02 |
| 2019/0178350 | A1 * | 6/2019 | Steinberger | ............ B60K 6/442 |
| 2021/0171137 | A1 | 6/2021 | Zuleger et al. | |

(Continued)

*Primary Examiner* — John D Walters
(74) *Attorney, Agent, or Firm* — FOLEY & LARDNER LLP

(57) ABSTRACT

A vehicle includes a chassis and an electric axle coupled to the chassis. The electric axle includes an electric motor, a tractive element coupled to the electric motor and configured to be driven by the electric motor to propel the vehicle, a power take off (PTO) shaft coupled to the electric motor, a drive shaft coupling the tractive element to the electric motor, and a housing coupled to the chassis and at least partially containing the electric motor, the drive shaft, and the PTO shaft.

17 Claims, 8 Drawing Sheets

(56) References Cited

U.S. PATENT DOCUMENTS

| | | |
|---|---|---|
| 2021/0354329 A1 | 11/2021 | Hou et al. |
| 2021/0354684 A1* | 11/2021 | Healy ................ B60L 15/2054 |
| 2022/0072736 A1 | 3/2022 | Steffens et al. |
| 2022/0118854 A1 | 4/2022 | Davis et al. |
| 2022/0134372 A1 | 5/2022 | Andringa |
| 2022/0134856 A1 | 5/2022 | Andringa et al. |

* cited by examiner

VEHICLE WITH E-AXLE

CROSS-REFERENCE TO RELATED PATENT APPLICATIONS

This application is a continuation of U.S. application Ser. No. 17/514,540, filed on Oct. 29, 2021, which claims the benefit of and priority to U.S. Provisional Application No. 63/107,581, filed on Oct. 30, 2020, the entire disclosures of which are hereby incorporated by reference herein.

BACKGROUND

The present disclosure relates to drive systems for vehicles. More particularly, the present disclosure relates to vehicles with electric axles.

SUMMARY

At least one embodiment relates to a vehicle including a chassis and an electric axle coupled to the chassis. The electric axle includes an electric motor, a first tractive element coupled to the electric motor and configured to be driven by the electric motor to propel the vehicle, and a power take off (PTO) shaft coupled to the electric motor. The vehicle further includes at least one of (a) an accessory coupled to the PTO shaft and configured to be driven by the electric motor or (b) an axle assembly including a second tractive element coupled to the PTO shaft and configured to be driven by the electric motor to propel the vehicle.

Another embodiment relates to a vehicle including a chassis, a rotary assembly coupled to the chassis, and a first electric axle and a second axle each coupled to the chassis. The first electric axle includes a first motor/generator, a plurality of first tractive elements configured to be driven by the first motor/generator, and a power take off (PTO) configured to be driven by the first motor/generator to drive the rotary assembly. The second electric axle includes a second motor/generator and a plurality of second tractive elements configured to be driven by the second motor/generator.

Another embodiment relates to an electric axle for a vehicle. The electric axle includes a first tractive element, a housing configured to be coupled to a chassis of the vehicle, an electric motor coupled to the housing and at least partially contained within the housing, a power transmission coupled to the electric motor and at least partially contained within the housing, and a power take off (PTO) shaft configured to be driven by the electric motor. The power transmission couples the first tractive element to the electric motor such that the electric motor is configured to provide mechanical energy to the first tractive element through the power transmission. The PTO shaft is configured to extend outside of the housing to be coupled to at least one of (a) an accessory configured to be driven by the electric motor or (b) an axle assembly including a second tractive element and configured to be driven by the electric motor.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the FIGURES, which illustrate the exemplary embodiments in detail, it should be understood that the present application is not limited to the details or methodology set forth in the description or illustrated in the FIGURES. It should also be understood that the terminology is for the purpose of description only and should not be regarded as limiting.

Overview

Referring generally to the FIGURES, systems and methods for driving a vehicle (e.g., a commercial vehicle) are shown. In some embodiments, vehicles include one or more electric axles or electronic axles (i.e., E-axles) that include an electric motor configured to produce mechanical energy, typically for the purposes of driving tractive elements or driveshafts of the axle to propel the vehicle. Commercial vehicles may have an independently operational electric motor that is configured to drive or provide mechanical input for an accessory. However, installing an additional electric motor results in additional cost and weight for the commercial vehicle. Similarly, a vehicle may include multiple electric axles, each with one or more dedicated electric motors. Providing dedicated electric motors to each of the axles may result in additional cost and weight for the vehicle. Advantageously, one or more electric axles of the vehicle can be configured to drive an accessory through a power take off. This reduces a need for an additional electric motor. Additionally or alternatively, one or more electric axles of the vehicle can be configured to drive an additional axle through a power take off. This reduces the need for multiple electric axles and can provide the flexibility to select which axles are driven by an electric motor.

Commercial Vehicle

Figure 1:
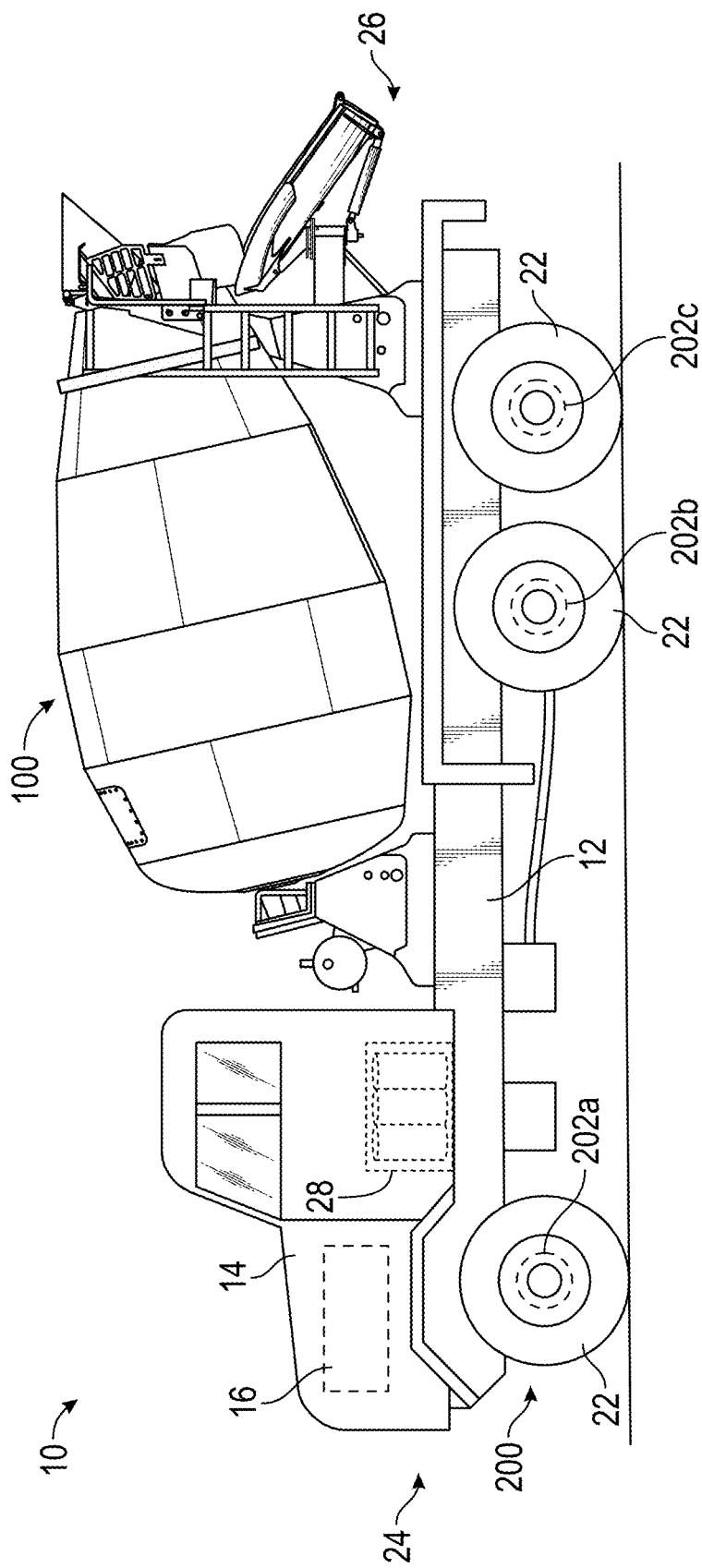
FIG. 1 is side view of a commercial vehicle including an electric drivetrain, according to an exemplary embodiment.

According to the exemplary embodiment shown in FIG. 1, a vehicle (e.g., a commercial vehicle, a refuse vehicle, a fire fighting vehicle, a fire suppression vehicle, a military vehicle, etc.), shown as commercial vehicle 10, includes an accessory feature or accessory, shown as drum assembly 100. According to an exemplary embodiment, the commercial vehicle 10 is configured as a rear-discharge concrete mixer truck. In other embodiments, the commercial vehicle 10 is configured as a front-discharge concrete mixer truck. In other embodiments, the commercial vehicle 10 is a fire fighting vehicle, a refuse vehicle, a transport vehicle, a military vehicle, etc., or any other type of vehicle. As shown in FIG. 1, the commercial vehicle 10 includes a chassis (e.g., a frame member, a support member, a structural member, etc.), shown as frame 12, and a cab, shown as cab 14, coupled to the frame 12 (e.g., at a front end thereof, etc.). The drum assembly 100 is coupled to the frame 12 and disposed behind the cab 14 (e.g., at a rear end thereof, etc.), according to the exemplary embodiment shown in FIG. 1. In other embodiments, at least a portion of the drum assembly 100 extends in front of the cab 14. The cab 14 may include various components to facilitate operation of the commercial vehicle 10 by an operator (e.g., a seat, a steering wheel, hydraulic controls, a user interface, switches, buttons, dials, etc.).

As shown in FIG. 1, the commercial vehicle 10 includes a prime mover, shown as engine 16, according to an exemplary embodiment. As shown in FIG. 1, the engine 16 is coupled to the frame 12 at a position beneath the cab 14. The engine 16 may be configured to utilize one or more of a variety of fuels (e.g., gasoline, diesel, bio-diesel, ethanol, natural gas, etc.), according to various exemplary embodiments. According to an alternative embodiment, the prime mover additionally or alternatively includes one or more electric motors and/or generators, which may be coupled to the frame 12 (e.g., a hybrid vehicle, an electric vehicle, etc.). The electric motors may consume electrical power from an on-board storage device (e.g., batteries, ultra-capacitors, etc.), from an on-board generator (e.g., an internal combustion engine, a genset, etc.), and/or from an external power source (e.g., overhead power lines, etc.) and provide power to systems of the commercial vehicle 10. In some embodiments, the commercial vehicle 10 does not include the engine 16 (e.g., the engine 16 is optional). In some embodiments, the engine 16 is an electric motor.

As shown in FIG. 1, the commercial vehicle 10 includes a plurality of tractive elements, shown as wheels 22, that engage a ground surface to support and move (e.g., propel) the commercial vehicle 10. In one embodiment, at least a portion of the mechanical power produced by the engine 16 flows through a transmission to power at least a portion of the wheels 22 (e.g., front wheels, rear wheels, etc.). In one embodiment, energy (e.g., mechanical energy, etc.) flows along a first power path defined from the engine 16, through the transmission, and to the wheels 22.

Referring still to FIG. 1, commercial vehicle 10 includes a drivetrain 200 (e.g., a chassis assembly, a frame assembly, a drive system, etc.). The drivetrain 200 includes a front axle 202a, a first rear axle 202b, and a second rear axle 202c. In some embodiments, the front axle 202a, the first rear axle 202b, and the second rear axle 202c are rotatably coupled with corresponding pairs of wheels 22. In this way, the commercial vehicle 10 may be a six-wheeled or three-axle commercial vehicle. In some embodiments, the front axle 202a, the first rear axle 202b, and/or the second rear axle 202c are each electric axles that include one or more corresponding electric motors configured to produce mechanical energy to drive the corresponding pairs of wheels 22. In some embodiments, the first rear axle 202b and the second rear axle 202c form a tandem axle assembly at a rear 26 (e.g., a rear end portion) of the commercial vehicle 10. The front axle 202a may be positioned at a front 24 of the commercial vehicle 10. The front axle 202a, the first rear axle 202b, and the second rear axle 202c are each fixedly coupled with the frame 12 and facilitate supporting the commercial vehicle 10. In some embodiments, the front axle 202a, the first rear axle 202b, and/or the second rear axle 202 are not electric axles.

The commercial vehicle 10 can include an electrical energy storage device 28 (e.g., a battery, a capacitor, etc.) that is configured to store electrical energy for one or more of the axles 202, or for one or more of the electric motors of the axles 202. In some embodiments, the one or more axles 202 are configured to consume electrical energy from the electrical energy storage device 28 to drive (e.g., propel) the commercial vehicle 10 and/or to drive an accessory of the commercial vehicle 10.

The commercial vehicle 10 may include a variety of different accessories. In some embodiments, the accessories are configured to receive a mechanical energy input (e.g., a rotational mechanical energy input) and provide some functionality in response to receiving the mechanical energy input. Accordingly, the accessories may be examples of rotary assemblies that receive a rotational mechanical energy input and provide some functionality in response to receiving the rotational mechanical energy input. By way of example, the accessories may include a pump that provides a flow of pressurized fluid. In some such examples, the pressurized fluid is a hydraulic oil that is supplied to one or more actuators (e.g., pumps, cylinders, etc.) that cause motion (e.g., linear motion, rotational motion, etc.) of one or more components of the commercial vehicle 10 (e.g., the drum assembly 100). In other such example, the pressurized fluid is water or another fluid, such as a firefighting foam, that is transported or sprayed by the commercial vehicle 10. By way of another example, the accessories may include a compressor that is configured to provide a flow of pressurized gas. By way of example, the compressor may be an air compressor that supplies compressed air to a continuous tire inflation system that maintains a desired air pressure within the wheels 22. By way of another example, the accessories may include one or more generators (e.g., alternators, motor/generators) that are configured to receive the mechanical energy input and provide an electrical energy output. In some embodiments, the inclusion of a generator may be beneficial to provide electrical energy that is conditioned differently than the electrical energy provided by the electrical energy storage device 28 (e.g., alternating current versus direct current, at a different voltage, frequency, and/or current, etc.). By way of another example, the accessories may include one or more actuators (e.g., wheels, conveyors, levers, etc.) that convert the mechanical energy input into a mechanical movement to perform a desired function (e.g., moving material or a portion of the commercial vehicle 10). In one such embodiment, the accessories include the drum assembly 100. In some embodiments, the accessories perform functions of the commercial vehicle 10 other than propelling the commercial vehicle 10 (e.g., the accessories do not propel the commercial vehicle).

Drive Train

Figure 2:
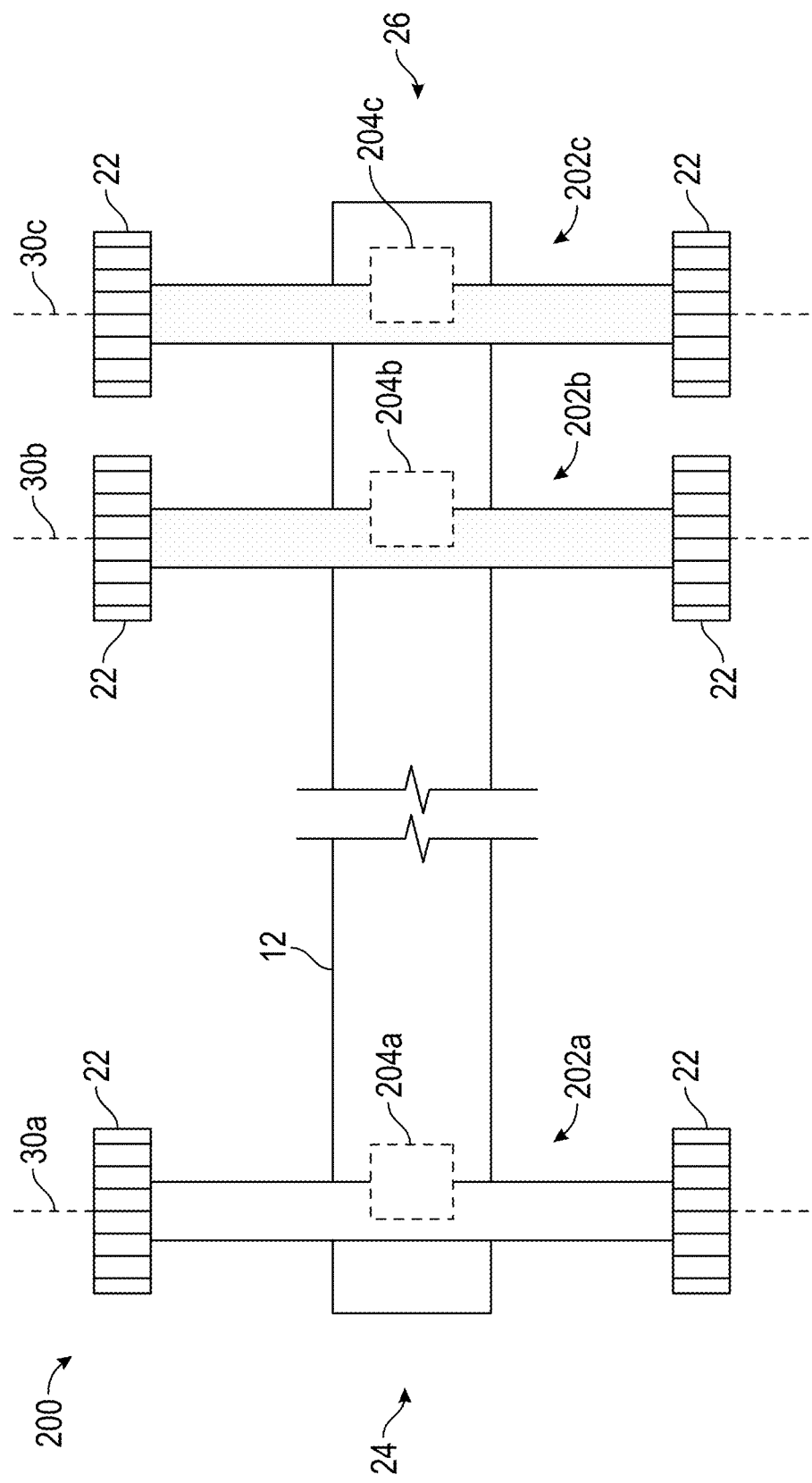
FIG. 2 is a schematic diagram of the electric drivetrain of FIG. 1 including at least one electric axle, according to an exemplary embodiment.

Referring particularly to FIG. 2, the drivetrain 200 is shown, according to an exemplary embodiment. The drivetrain 200 includes the front axle 202a, the first rear axle 202b, and the second rear axle 202c. In some embodiments, both the first rear axle 202b and the second rear axle 202c are positioned at the rear 26 of the frame 12. The front axle 202a is positioned at the front 24 of the frame 12. The first rear axle 202b and the second rear axle 202c form a tandem at the rear 26 of the frame 12. It should be understood that while the drivetrain 200 as described herein is a rear-tandem drivetrain (including a pair of axles 202 at the rear, with a single axle in the front), drivetrain 200 may be similarly configured as a front-tandem drivetrain (including a pair of axles 202 at the front, and a single axle at the rear). In other embodiments, the drivetrain 200 is configured with three axles spaced equally apart along the frame 12. In some embodiments, the drivetrain 200 includes three or more axles 202. In some embodiments, at least two of the axles 202 are electric axles including an electric motor that is configured to consume electrical energy provided by the electrical energy storage device 28. In other embodiments, only one of the axles 202 is an electric axle.

As shown in FIG. 2, each of the axles 202 may include an electric motor 204 (e.g., a motor/generator, an electromagnetic device, etc.) that is configured to consume electrical energy from the electrical energy storage device 28 and generate (e.g., provide) mechanical power (e.g., rotational mechanical energy) using the electrical energy. In other embodiments, the axles 202 may include multiple electric motors 204 (e.g., two or more). Accordingly, any embodiment described herein as including a single electric motor (e.g., an electric motor 314) may include multiple electric motors operating cooperatively (e.g., multiple electric motors with output shafts coupled to one another). Each of the axles 202 is rotatably coupled with a pair of wheels 22. In some embodiments, the wheels 22 are configured to rotate about a corresponding axis 30 that is defined by the corresponding axle 202. For example, the front axle 202a may define an axis 30a about which the wheels 22 of front axle 202a rotate, the first rear axle 202b may define an axis 30b about which the wheels 22 of the first rear axle 202b rotate, and the second rear axle 202c may define an axis 30c about which the wheels 22 of the second rear axle 202c rotate.

The front axle 202a may be an electric axle, and may include an electric motor 204a that drives the wheels 22 of the front axle 202a to propel the commercial vehicle 10. In other embodiments, the front axle 202a does not include the electric motor 204a and the wheels 22 rotate about the axis 30a in response to transportation of the commercial vehicle 10 (e.g., due to engagement between the wheels 22 and a ground surface) and/or in response to being driven by another electric motor. Similarly, the first rear axle 202b and/or the second rear axle 202c may be electric axles. The first rear axle 202b may include the electric motor 204b, and the second rear axle 202c may include the electric motor 204c. The electric motor 204b is configured to generate mechanical energy that can be transferred through the axle 202b to drive the wheels 22 about the axis 30b. Similarly, the electric motor 204c is configured to generate mechanical energy that can be transferred through the axle 202c to drive the wheels 22 about the axis 30c. In some embodiments, the electric motors 204 are configured to perform regenerative braking by receiving rotational mechanical energy from the wheels 22 and providing electrical energy (e.g., to the energy storage device 28). In other embodiments, the first rear axle 202b does not include the electric motor 204b and/or the second rear axle 202c does not include the electric motor 204c. In such embodiments, the wheels 22 rotate about the axis 30b and/or the axis 30c in response to transportation of commercial vehicle 10 (e.g., due to engagement between wheels 22 and a ground surface) and/or in response to being driven by another electric motor.

In this way, the front axle 202a, the first rear axle 202b, and/or the second rear axle 202c may be configured to drive and/or brake the commercial vehicle 10 for transportation. In some embodiments, only one of the first rear axle 202b and the second rear axle 202c is required to operate using its corresponding electric motor 204 to drive commercial vehicle 10 for transportation. For example, the electric motor 204b may selectively disengage (e.g., transition into a neutral setting) so that commercial vehicle 10 is only driven to transport by second rear axle 202c (e.g., by driving the corresponding set or pair of wheels 22 about axis 30c).

Drive Configurations

Figure 3:
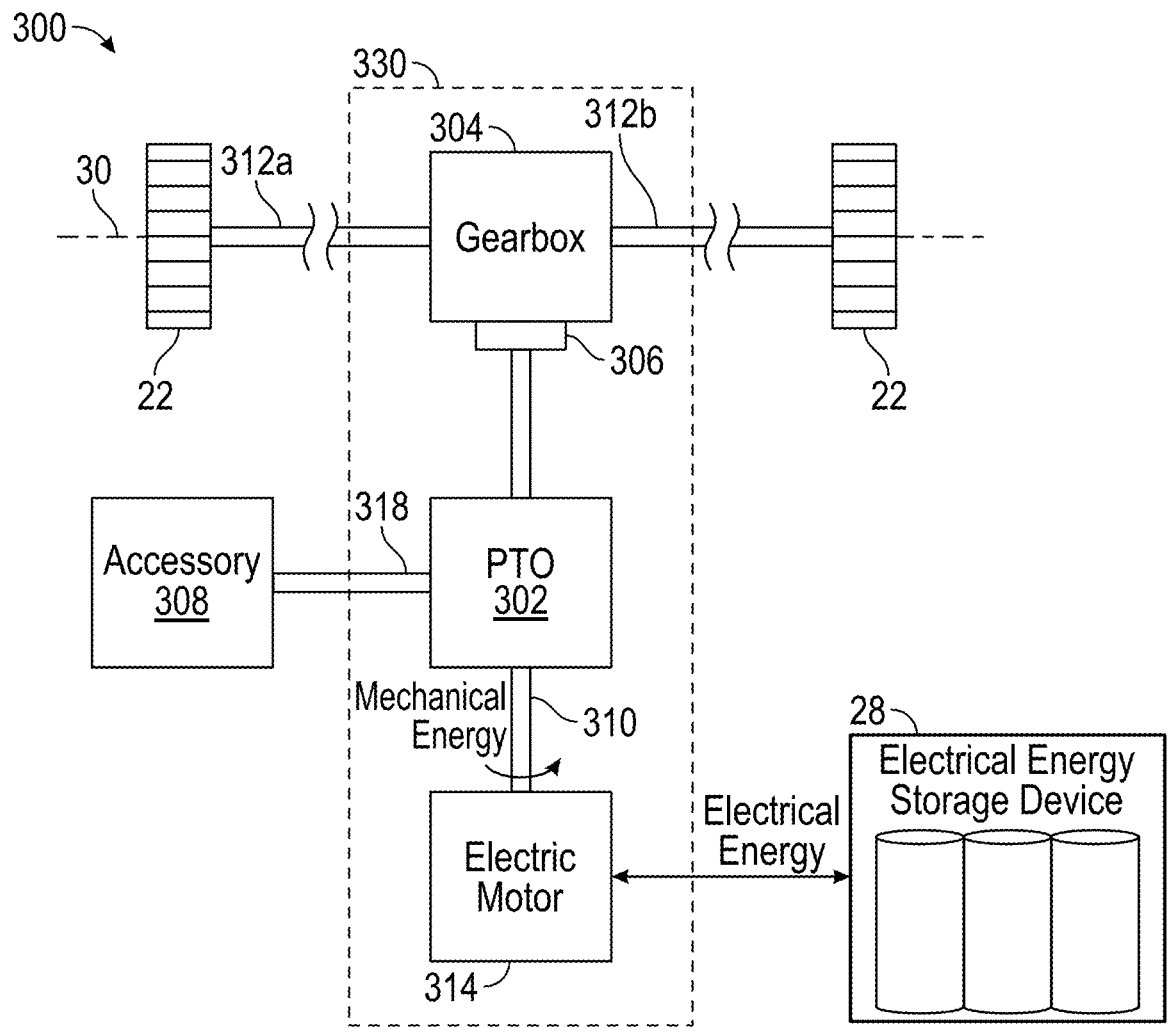
FIG. 3 is a block diagram of an electric axle usable with the electric drivetrain of FIG. 2, according to an exemplary embodiment.

Referring to FIG. 3, an electric axle 300 (e.g., an electric axle assembly, a drive assembly, etc.) is shown, according to an exemplary embodiment. In some embodiments, the electric axle 300 is the same as or similar to any of the front axle 202a, the first rear axle 202b, or the second rear axle 202c. For example, the first rear axle 202b and the second rear axle 202c may be electric axles 300 that include electric motors for independently driving tractive elements (e.g., wheels) and/or an accessory of the commercial vehicle 10.

Referring still to FIG. 3, the electric axle 300 includes an electric motor 314 (e.g., the electric motor 204), a power take off (PTO) 302, an accessory device 308, a gearbox 304 (e.g., a power transmission), a clutch 306 (e.g., an actuator), an output driveshaft 310, and a pair of axles 312 or drive shafts (e.g., a first half shaft 312a and a second half shaft 312b). The electric motor 314 (e.g., a motor/generator) is configured to consume electrical energy provided by the electrical energy storage device 28 and output mechanical energy. For example, the electric motor 314 may drive an output driveshaft 310 (e.g., an output shaft). In some embodiments, output driveshaft 310 extends outwards from the electric motor 314 and is received at an opposite end by the gearbox 304 (e.g., the opposite end of the output driveshaft 310 is coupled to the gearbox 304). The gearbox 304 can be or include a reduction gearbox (e.g., a gearset that receives input mechanical energy at a first speed and outputs mechanical energy at a second, lower, speed and an increased torque) or may be or include a gearbox that receives input mechanical energy at a first speed and outputs mechanical energy at a second, higher, speed and a decreased torque. In some embodiments, the gearbox 304 is or includes a differential that is configured to receive rotational kinetic energy or mechanical energy (e.g., through the output driveshaft 310) about an axis in a first direction, and output rotational kinetic energy or mechanical energy (e.g., through axles 312) about axis 30 that extends in a different direction.

The PTO 302 may be configured to selectively engage the output driveshaft 310 by transitioning between an engaged state and a disengaged state. In some embodiments, PTO 302 is electrically activated and transitions into the engaged state in response to receiving a control signal from a controller. PTO 302 can include a clutch (e.g., an electrically activated clutch) that is configured to engage the output driveshaft 310 to selectively couple PTO 302 with the output driveshaft 310. When PTO 302 engages the output driveshaft 310, the PTO 302 transfers mechanical energy to the accessory 308 of the commercial vehicle 10 through a driveshaft 318 (e.g., a PTO shaft, a PTO output shaft, etc.), a gearset, a gearbox, etc., or any other driven elements. The mechanical energy is transferred to the accessory 308 through PTO 302 to drive the accessory 308 so that the accessory 308 can perform its respective functions. For example, the accessory 308 may be or include a hydraulic system including a hydraulic pump. The mechanical energy generated by the electric motor 314 can be transferred through the PTO 302 to the hydraulic pump to pressurize the hydraulic system.

In some embodiments, the output driveshaft 310 is selectively rotatably coupled with gearbox 304 through the clutch 306. The clutch 306 can also be an electrically activated clutch that is transitionable or actuatable between an engaged state and a disengaged state in response to receiving a control signal. In some embodiments, the PTO 302 and the clutch 306 can each be activated or transitioned into the engaged state so that the electric motor 314 drives both the accessory 308 (though the PTO 302) and the gearbox 304 (through the clutch 306). In some embodiments, engagement of PTO 302 and clutch 306 may be coordinated (e.g., by a controller) so that the PTO 302 and/or the clutch 306 engage or disengage respectively to transition the electric axle 300 between various modes. For example, in a neutral mode or state, both the clutch 306 and the PTO 302 may be transitioned into the disengaged mode or state so that the axles 312 can be driven (e.g., through engagement between wheels 22 and the ground surface) without back-driving the electric motor 314 or the accessory 308. In an accessory and drive mode or state, the PTO 302 and the gearbox 304 can both be engaged so that torque output, rotational kinetic energy output, or mechanical energy output of the electric motor 314 is transferred to both the accessory 308 and the gearbox 304. In this way, the electric motor 314 may drive both the accessory 308 and the gearbox 304.

In an accessory only mode or state, the PTO 302 may engage the output driveshaft 310, while the clutch 306 does not engage the output driveshaft 310. In this way, the electric motor 314 may drive the accessory 308, without driving the gearbox 304 (and thus the wheels 22). In a drive only mode or state, the PTO 302 may be disengaged and the gearbox 304 may be engaged. In this way, the electric motor 314 may drive the gearbox 304, without driving the accessory 308.

As shown in FIG. 3, the electric axle 300 is a self-contained axle assembly. The electric axle 300 includes a housing or enclosure, shown as housing 330, that contains and supports the components of the electric axle 300. The housing 330 may be coupled to the frame 12. By way of example, the housing 330 may define one or more mounting points (e.g., bolt holes, protrusions, flanges, etc.) through which the electric axle 300 is coupled to the frame 12. As shown, the housing 330 at least partially (e.g., partially, completely) contains the gearbox 304, the clutch 306, the PTO 302, the output driveshaft 310, and the electric motor 314. The axles 312 extend outside of the housing 330 to couple to the wheels 22. The driveshaft 318 extends outside of the housing 330 to couple to the accessory 308.

The housing 330 may be arranged such that the electric axle 300 forms a self-contained subassembly. The housing 330 may be selectively coupled to the frame 12 to facilitate removal of the electric axle 300 from the frame 12 without disassembly of the electric axle 300 or with minimal disassembly of the electric axle 300. By way of example, the housing 330 may be removed from the frame 12 (e.g., by removing one or more fasteners) without disconnecting the electric motor 314, the output driveshaft 310, the PTO 302, the output driveshaft 318, the clutch 306, the gearbox 304, the axles 312, or the wheels 22 from the electric axle 300.

Figure 4:
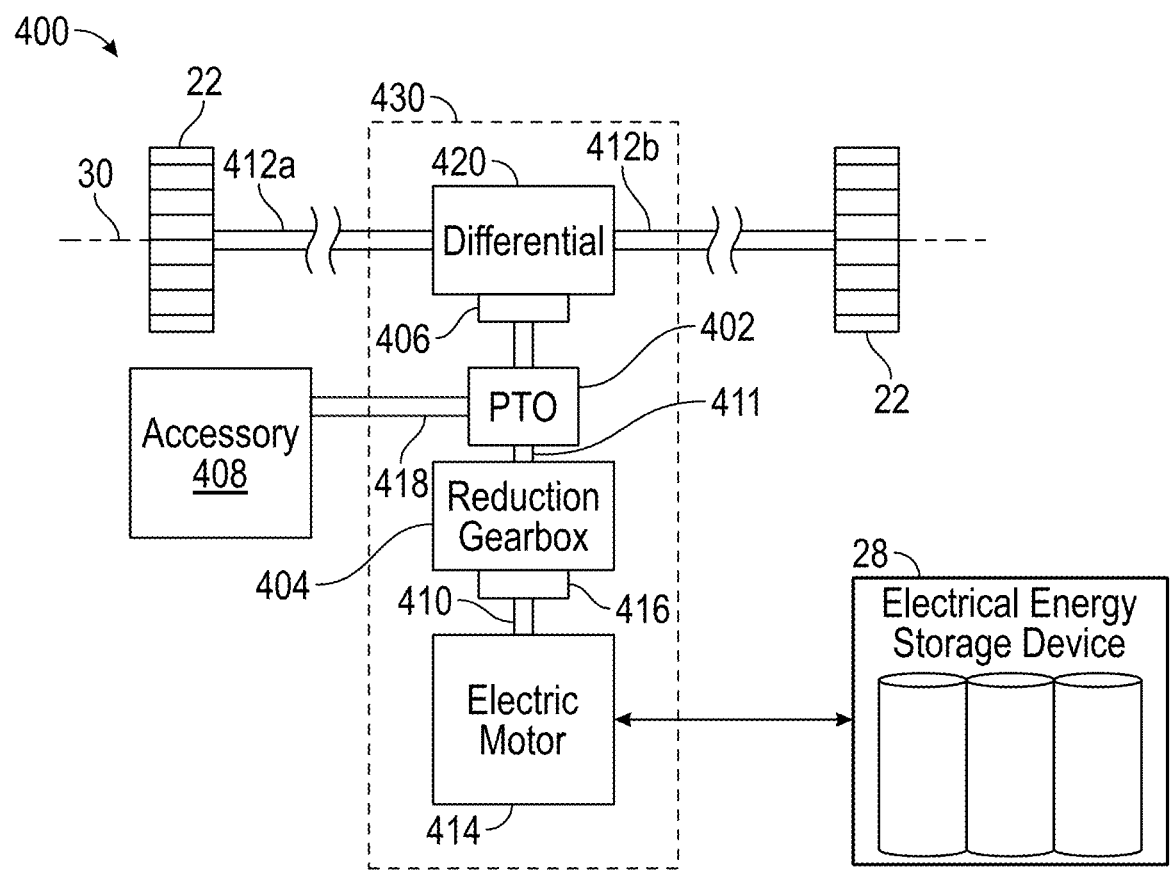
FIG. 4 is a block diagram of an electric axle usable with the electric drivetrain of FIG. 2, according to another exemplary embodiment.

Referring to FIG. 4, an electric axle 400 is shown, according to another embodiment. The electric axle 400 can be the same as or similar to the electric axle 300 and may share similar components with the electric axle 300. Accordingly, any description with respect to the electric axle 300 may apply to the electric axle 400 except as otherwise specified herein. The electric axle 400 is re-numbered for ease of illustration.

The electric axle 400 includes an electric motor 414, an output driveshaft 410, a clutch 416, a reduction gearbox 404 (e.g., a power transmission), a power take off (PTO) 402, a clutch 406, a differential 420, axles 412 or drive shafts (including half shaft 412a and half shaft 412b), and a driveshaft 418. In some embodiments, electric motor 414 is the same as or similar to the electric motor 314 of the electric axle 300. Similarly, the PTO 402 may be the same as or similar to the PTO 302, the clutch 406 may be the same as or similar to the clutch 306, the axles 412 may be the same as or similar to the axles 312, the driveshaft 418 may be the same as or similar to the driveshaft 318, and the housing 430 may the same as or similar to the housing 330.

The electric axle 400 can be similar to the electric axle 300 but includes the reduction gearbox 404 and the differential 420 instead of the gearbox 304. In some embodiments, the reduction gearbox 404 and the differential 420 operate in unison to perform similar functions to the gearbox 304. In some embodiments, the reduction gearbox 404 is configured to receive a mechanical energy input from the electric motor 414 (through the output driveshaft 410) and provide a mechanical energy output (e.g., a rotational kinetic energy) at a reduced speed to the PTO 402 and/or the differential 420.

The reduction gearbox 404 can removably (e.g., selectively) couple (e.g., rotationally engage) with the output driveshaft 410 through the clutch 416. The clutch 416 may be an electrically activated clutch that is configured to activate to engage the reduction gearbox 404 with the output driveshaft 410. When the clutch 416 is engaged, the reduction gearbox 404 receives the mechanical energy or torque output of the electric motor 414 from the output driveshaft 410 and outputs mechanical energy, torque, or rotational kinetic energy at a reduced speed to the output driveshaft 411. The output driveshaft 411 can provide a mechanical energy output as an input to the PTO 402 and/or the differential 420. In some embodiments, the PTO 402 is similar to PTO 302 and is configured to engage the output driveshaft 411 with the driveshaft 418 to receive at least a portion of the mechanical energy in response to receiving a control signal. Likewise, the clutch 406 may be an electrically activated clutch that is configured to activate or engage the output driveshaft 411 with the differential 420 in response to receiving a control signal.

In some embodiments, the PTO 402, the clutch 416, and the clutch 406 can be independently activated to achieve a variety of modes. The differential 420 is configured to receive rotational kinetic energy or mechanical energy about an axis of rotation extending through output driveshaft 411 and output mechanical energy or rotational kinetic energy about axes that extend through the axles 412 (e.g., in a direction other than the direction of the axis of rotation that extends through the output driveshaft 411). In some embodiments, the differential 420 permits relative rotation between the axles 412 to facilitate turning of the commercial vehicle 10.

The electric axle 400 can be operated similarly to the electric axle 300, but the PTO 402 receives rotational kinetic energy downstream of the reduction gearbox 404 to drive the accessory 408. Depending upon a required input speed for the accessory 408 or the accessory 308, a PTO (e.g., the PTO 302 and/or the PTO 402) can be positioned downstream of the reduction gearbox 404 (as shown in FIG. 4) or upstream of the reduction gearbox 404 (as shown in FIG. 3). In this way, the PTO can be positioned such as to receive rotational kinetic energy at a required input speed to drive the accessory (e.g., the accessory 308, the accessory 408, an accessory system, etc.). The PTO 402 may drive the accessory 408 through driveshaft 418.

Similar to the electric axle 300, the electric axle 400 is a self-contained axle assembly. The electric axle 400 includes a housing or enclosure, shown as housing 430, that contains and supports the components of the electric axle 400. As shown, the housing 430 at least partially (e.g., partially, completely) contains the reduction gearbox 404, the clutch 406, the differential 420, the clutch 406, the clutch 416, the PTO 402, the output driveshaft 410, the output driveshaft 411, and the electric motor 414. The axles 412 extend outside of the housing 430 to couple to the wheels 22. The driveshaft 418 extends outside of the housing 330 to couple to the accessory 308.

The housing 430 may be arranged such that the electric axle 400 forms a self-contained subassembly. The housing 430 may be selectively coupled to the frame 12 to facilitate removal of the electric axle 400 from the frame 12 without disassembly of the electric axle 400 or with minimal disassembly of the electric axle 400. By way of example, the housing 430 may be removed from the frame 12 (e.g., by removing one or more fasteners) without disconnecting the electric motor 414, the output driveshaft 410, the clutch 416, the reduction gearbox 404, the PTO 402, the output driveshaft 411, the output driveshaft 418, the clutch 406, the differential 420, the axles 412, or the wheels 22 from the electric axle 400.

Figure 5:
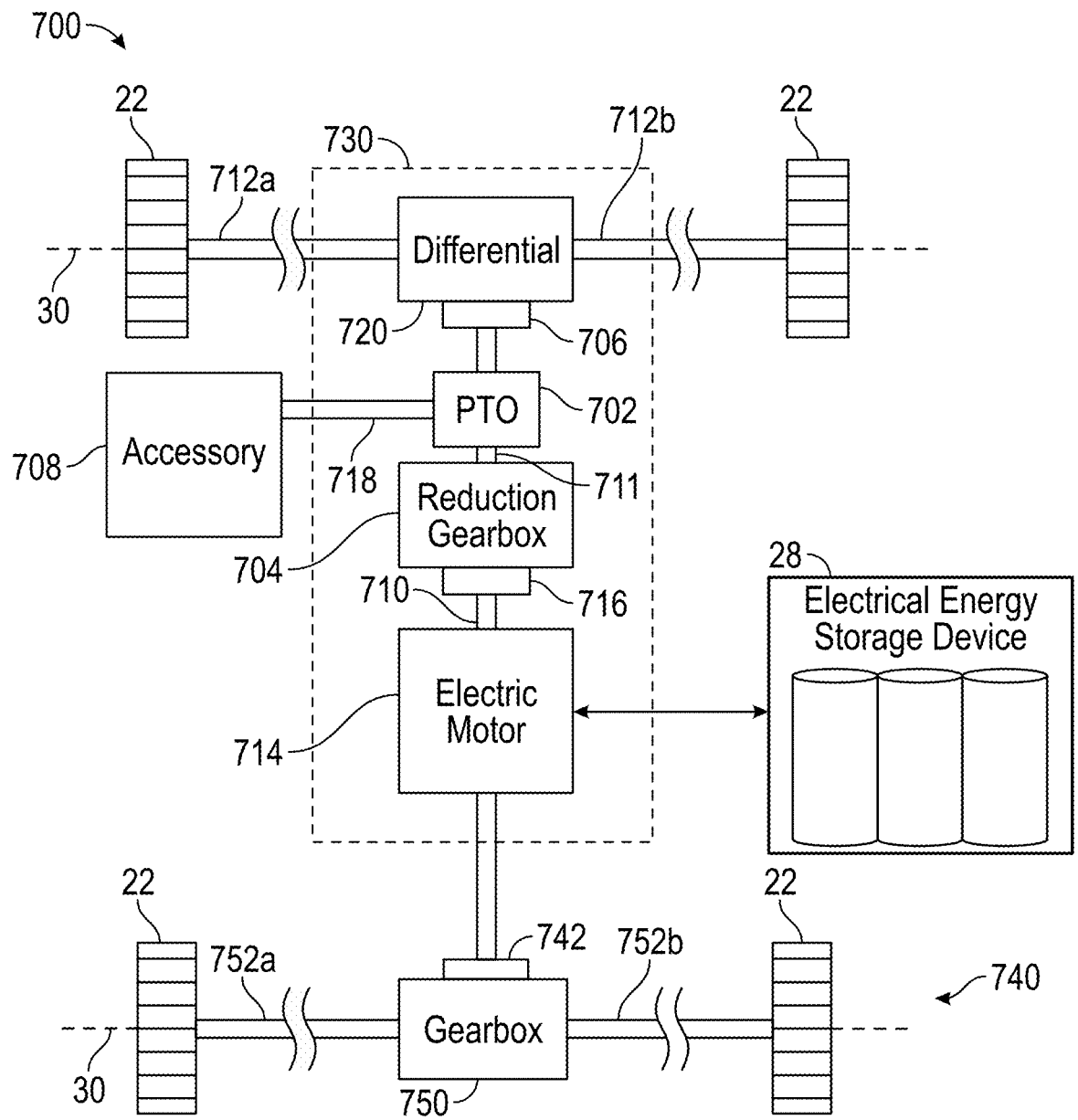
FIG. 5 is a block diagram of an electric axle usable with the electric drivetrain of FIG. 2, according to yet another exemplary embodiment.

Referring to FIG. 5, an electric axle 700 is shown, according to another embodiment. The electric axle 700 can be the same as or similar to the electric axle 400 and may share similar components with the electric axle 400. Accordingly, any description with respect to the electric axle 300 or the electric axle 400 may apply to the electric axle 700 except as otherwise specified herein. The electric axle 700 is re-numbered for ease of illustration.

The electric axle 700 includes an electric motor 714, an output driveshaft 710, a clutch 716, a reduction gearbox 704 (e.g., a power transmission), a power take off (PTO) 702, a clutch 706, an output driveshaft 711, axles 712 or drive shafts (including half shaft 712a and half shaft 712b), a driveshaft 718, and a differential 720. In some embodiments, the electric motor 714 is the same as or similar to the electric motor 414 of the electric axle 400. Similarly, the PTO 702 may be the same as or similar to the PTO 402, the clutch 706 may be the same as or similar to the clutch 406, the output driveshaft 711 may be the same as or similar to the output driveshaft 411, the axles 712 may be the same as or similar to the axles 412, the clutch 716 may be the same as or similar to the clutch 416, the driveshaft 718 may be the same as or similar to the driveshaft 418, the differential 720 may be the same as or similar to the differential 420, and the housing 730 may the same as or similar to the housing 430.

The electric axle 700 can be similar to the electric axle 400 except as otherwise specified herein. The electric axle 700 is further configured to selectively provide rotational mechanical energy to power a second axle or external axle assembly, shown as axle assembly 740. The axle assembly 740 may be an example of a rotary assembly that is driven by electric motor 714. The axle assembly 740 may not include an integrated electric motor, such that the axle assembly 740 is not an electric axle. Instead, the axle assembly 740 may be driven exclusively by the electric axle 700. In some embodiments, the electric axle 700 and the axle assembly 740 form a tandem. By way of example, the electric axle 700 may be the first rear axle 202b, and the axle assembly 740 may be the second rear axle 202c. By way of another example, the electric axle 700 may be the second rear axle 202c, and the axle assembly 740 may be the first rear axle 202b.

Utilizing the electric axle 700 to selectively power (e.g., drive) the axle assembly 740 permits more flexible operation of the commercial vehicle 10 than utilizing two independent electric axles. When the electric axle 700 is disengaged from the axle assembly 740, all of the power delivered by the electric motor 714 can be directed through the wheels 22 of the electric axle 700. In contrast, a system including two electric axles would require two separate electric motors, each of which independently drives the wheels of the corresponding axle. In such a configuration, it would not be possible to direct all of the power of both motors through the same set of wheels (i.e., the wheels associated with one of the axles). Accordingly, the electric axle 700 permits a greater output power through a set of wheels for a given motor size than an arrangement that includes two independent electric axles. When it is desirable to drive the wheels 22 of the electric axle 700 and the wheels of the axle assembly 740 simultaneously (e.g., in a low traction environment), the electric axle 700 can be coupled to the axle assembly 740. Accordingly, the arrangement of FIG. 6 can provide similar or the same all-wheel drive performance to an arrangement that utilizes two independent electric axles.

The axle assembly 740 includes a gearbox 750 (e.g., a power transmission) that is selectively coupled to the output driveshaft 710 of the electric motor 714 by a clutch 742. Accordingly, in the electric axle 700, the output driveshaft 710 acts as a PTO shaft or PTO output shaft that couples the electric axle 700 to the axle assembly 740. In other embodiments, an additional shaft (e.g., an additional drive shaft) couples the electric motor 714 to the axle assembly 740. By way of example, an additional shaft may be arranged in series between the output driveshaft 710 and the clutch 742. The gearbox 750 may include a differential (e.g., similar to the differential 720) and/or a gearbox that provides an output speed that is greater than or less than an input speed from the electric motor 714 (e.g., similar to the reduction gearbox 704). Accordingly, the gearbox 740 may be similar to or the same as the gearbox 304. The gearbox 740 is coupled to a pair of wheels 22 by a pair of axles 752 (a half shaft 752a and a half shaft 752b).

In operation, the clutch 742 may be disengaged to decouple the axle assembly 740 from the electric axle 700 and the electric motor 714. In such a configuration, the wheels 22 may rotate freely, independent of the electric motor 714. The clutch 742 may be engaged (e.g., electrically, pneumatically, hydraulically, etc.) to couple the electric motor 714 to the gearbox 750. The electric motor 714 may consume electrical energy from the electrical energy storage device 28 and provide rotational mechanical energy to the wheels 22 through the output driveshaft 710, the clutch 742, the gearbox 750, and the axles 752, driving the wheels 22 to propel the commercial vehicle 10.

In some embodiments, the PTO 702, the clutch 706, the clutch 716, and the clutch 742 can be independently activated to achieve a variety of modes. By activating or deactivating the PTO 702, the clutch 706, the clutch 716, and the clutch 742, the wheels 22 of the electric axle 700, the accessory 708, and the wheels 22 of the axle assembly 740 can be driven in any combination by the electric motor 714. By way of example, in an all wheel drive mode of operation, the clutch 706, the clutch 716, and the clutch 742 may be engaged such that the electric motor 714 drives the wheels 22 of the electric axle 700 and the wheels 22 of the axle assembly 740.

Similar to the electric axle 300 and the electric axle 400, the electric axle 700 is a self-contained axle assembly. The electric axle 700 includes a housing or enclosure, shown as housing 730, that contains and supports the components of the electric axle 700. As shown, the housing 730 at least partially (e.g., partially, completely) contains the reduction gearbox 704, the clutch 706, the differential 720, the clutch 706, the clutch 716, the PTO 702, the output driveshaft 710, the output driveshaft 711, and the electric motor 714. The axles 712 extend outside of the housing 730 to couple to the wheels 22. The driveshaft 718 extends outside of the housing 730 to couple to the accessory 708. The output driveshaft 710 extends outside of the housing 730 to couple to the axle assembly 740.

The housing 730 may be arranged such that the electric axle 700 forms a self-contained subassembly. The housing 730 may be selectively coupled to the frame 12 to facilitate removal of the electric axle 700 from the frame 12 without disassembly of the electric axle 700 or with minimal disassembly of the electric axle 700. By way of example, the housing 730 may be removed from the frame 12 (e.g., by removing one or more fasteners) without disconnecting the electric motor 714, the output driveshaft 710, the clutch 716, the reduction gearbox 704, the PTO 702, the output driveshaft 711, the output driveshaft 718, the clutch 706, the differential 720, the axles 712, or the wheels 22 from the electric axle 700.

In some embodiments, the PTO 702, the output driveshaft 718, and the accessory 708 are omitted. In such embodiments, the electric axle 700 operates only to propel or brake the commercial vehicle 10. One or more accessories may be driven by other sources of mechanical energy onboard the commercial vehicle 10, or the commercial vehicle 10 may not be equipped with any accessories.

In other embodiments, an arrangement of the electric axle 300 of FIG. 3 is configured to provide rotational mechanical energy to an axle assembly, such as the axle assembly 740. By way of example, the output driveshaft 310 may extend outside of the housing 330 to couple to the axle assembly. In some embodiments, an electric axle (e.g., the electric axle 300, the electric axle 400, the electric axle 700, etc.) includes a reduction gearbox between an electric motor and an external axle assembly, such as the axle assembly 740.

Figure 8:
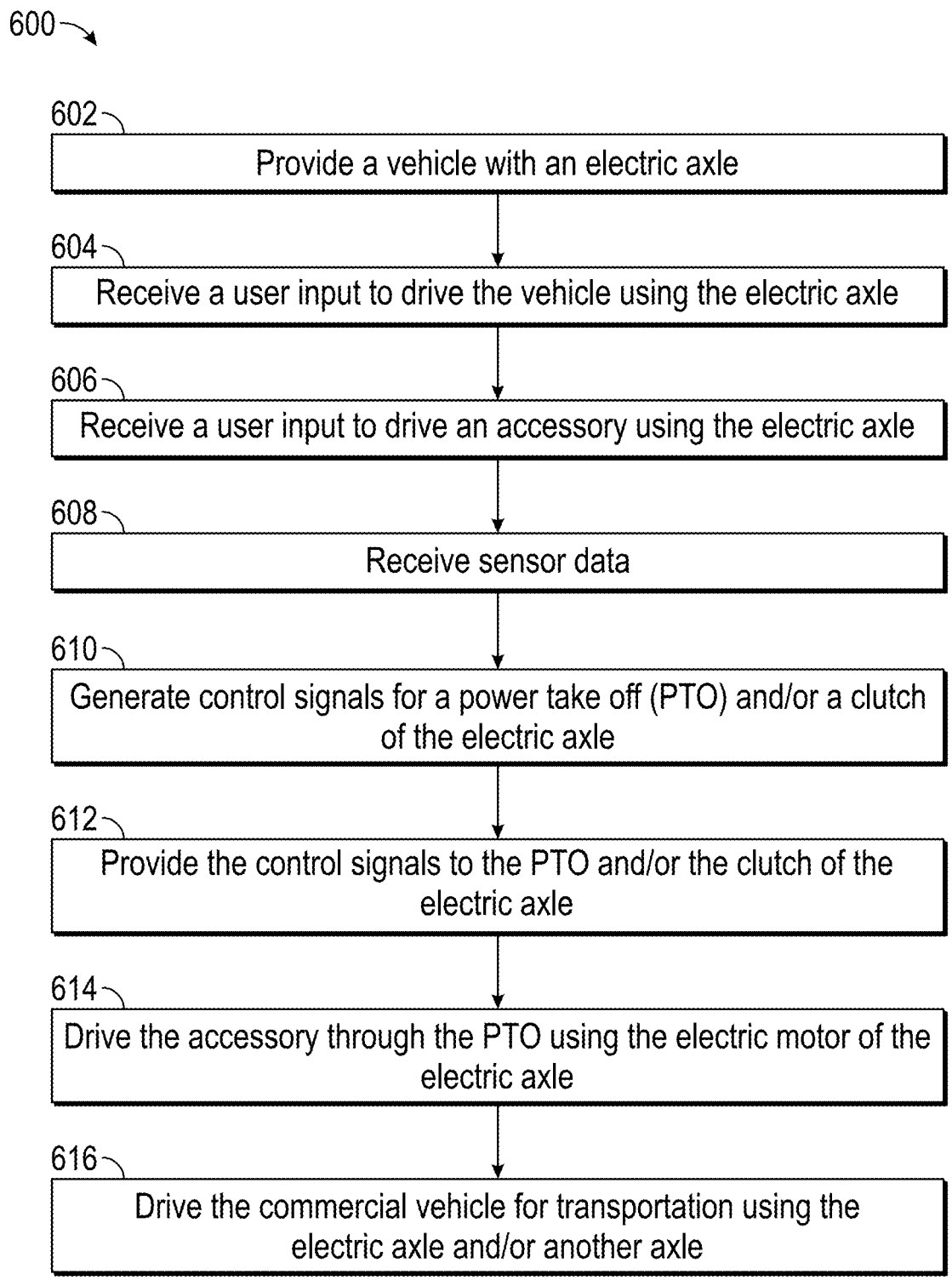
FIG. 8 is a flow diagram of a process for operating a commercial vehicle with an electric axle, according to an exemplary embodiment.

FIG. 8 illustrates a drive assembly or drive system, shown as drive system 800. The drive system 800 may be substantially similar to the electric axle 700 except as otherwise specified herein. In the drive system 800, the housing 730 is omitted. Accordingly, the drive system 800 does not form a self-contained e-axle. As shown, the electric motor 714 is positioned between the axis 30 of one axle (e.g., the first rear axle 202b) and the axis 30 of another axle (e.g., the axle assembly 740, the second rear axle 202c).

Control System

Figure 7:
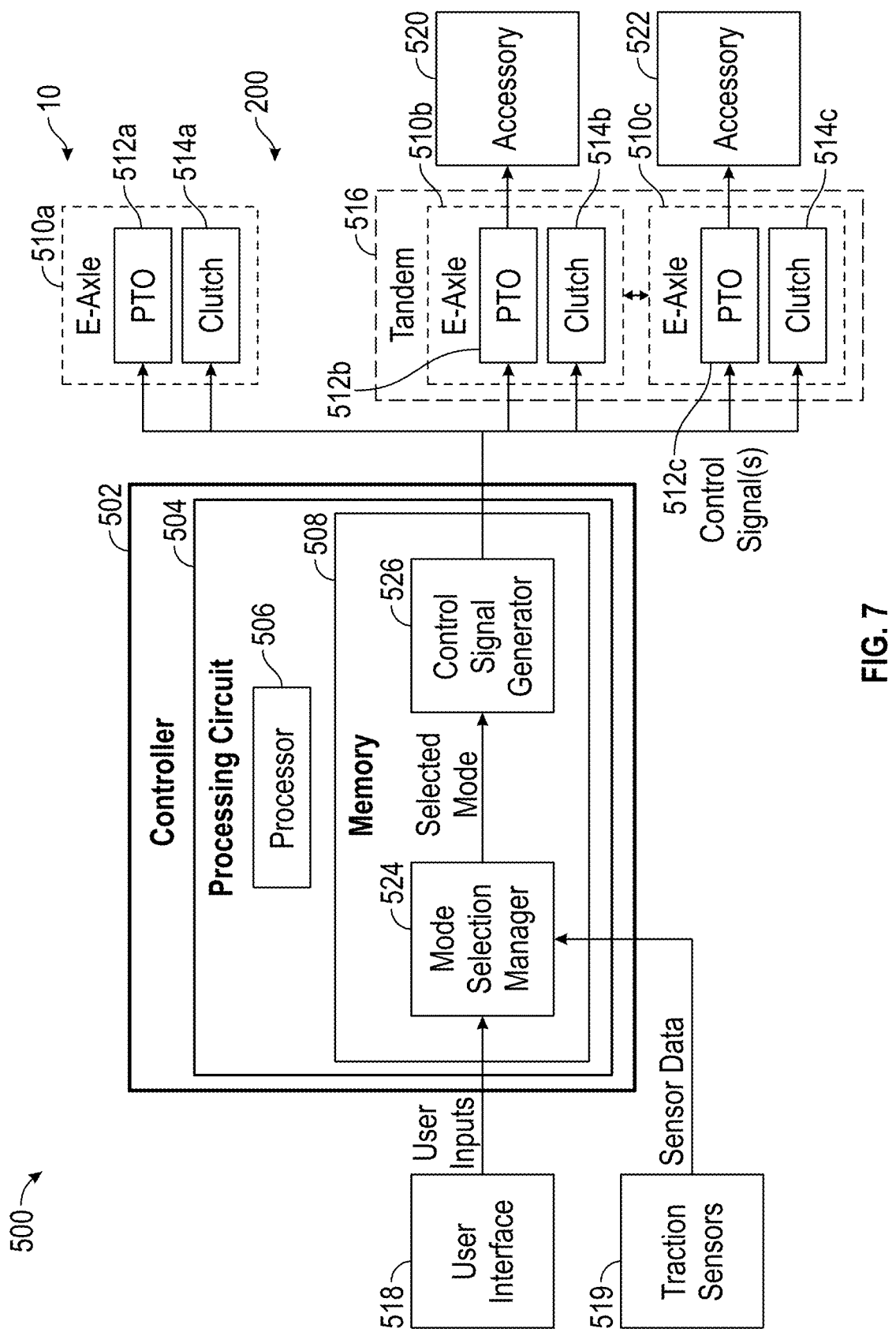
FIG. 7 is a block diagram of a control system for the electric drivetrain of FIG. 2, according to an exemplary embodiment.

Referring particularly to FIG. 7, a control system 500 for operating the drivetrain 200 of the commercial vehicle 10 is shown, according to an exemplary embodiment. The control system 500 includes a controller 502, a user interface 518, one or more sensors, shown as traction sensors 519, a first electronic axle 510a, and a second electronic axle 510b and a third electronic axle 510c that form a tandem 516. In some embodiments, the first electronic axle 510a is a front axle (e.g., front axle 202a). In some embodiments, one or more of the first electronic axle 510a, the second electronic axle 510b, or the third electronic axle 510c are not electric axles (e.g., does not generate mechanical energy to drive its respective pair of wheels 22). In some embodiments, the second electronic axle 510b is the first rear axle 202b. In some embodiments, the third electronic axle 510c is the second rear axle 202c. In some embodiments, mechanical power or energy that is used to power the commercial vehicle 10 for transportation generally originates from tandem 516.

The controller 502 includes a processing circuit 504 including a processor 506 and a memory 508. The processing circuit 504 can be communicably connected with a communications interface of the controller 502 such that the processing circuit 504 and the various components thereof can send and receive data via the communications interface. The processor 506 can be implemented as a general purpose processor, an application specific integrated circuit (ASIC), one or more field programmable gate arrays (FPGAs), a group of processing components, or other suitable electronic processing components.

The memory 508 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. The memory 508 can be or include volatile memory or non-volatile memory. The memory 508 can include database components, object code components, script components, or any other type of information structure for supporting the various activities and information structures described in the present application. According to some embodiments, the memory 508 is communicably connected to the processor 506 through the processing circuit 504 and includes computer code for executing (e.g., by the processing circuit 504 and/or the processor 506) one or more processes described herein.

In some embodiments, controller 502 is implemented within a single computer (e.g., one server, one housing, etc.). In various other embodiments, controller 502 can be distributed across multiple servers or computers (e.g., that can exist in distributed locations).

Figure 6:
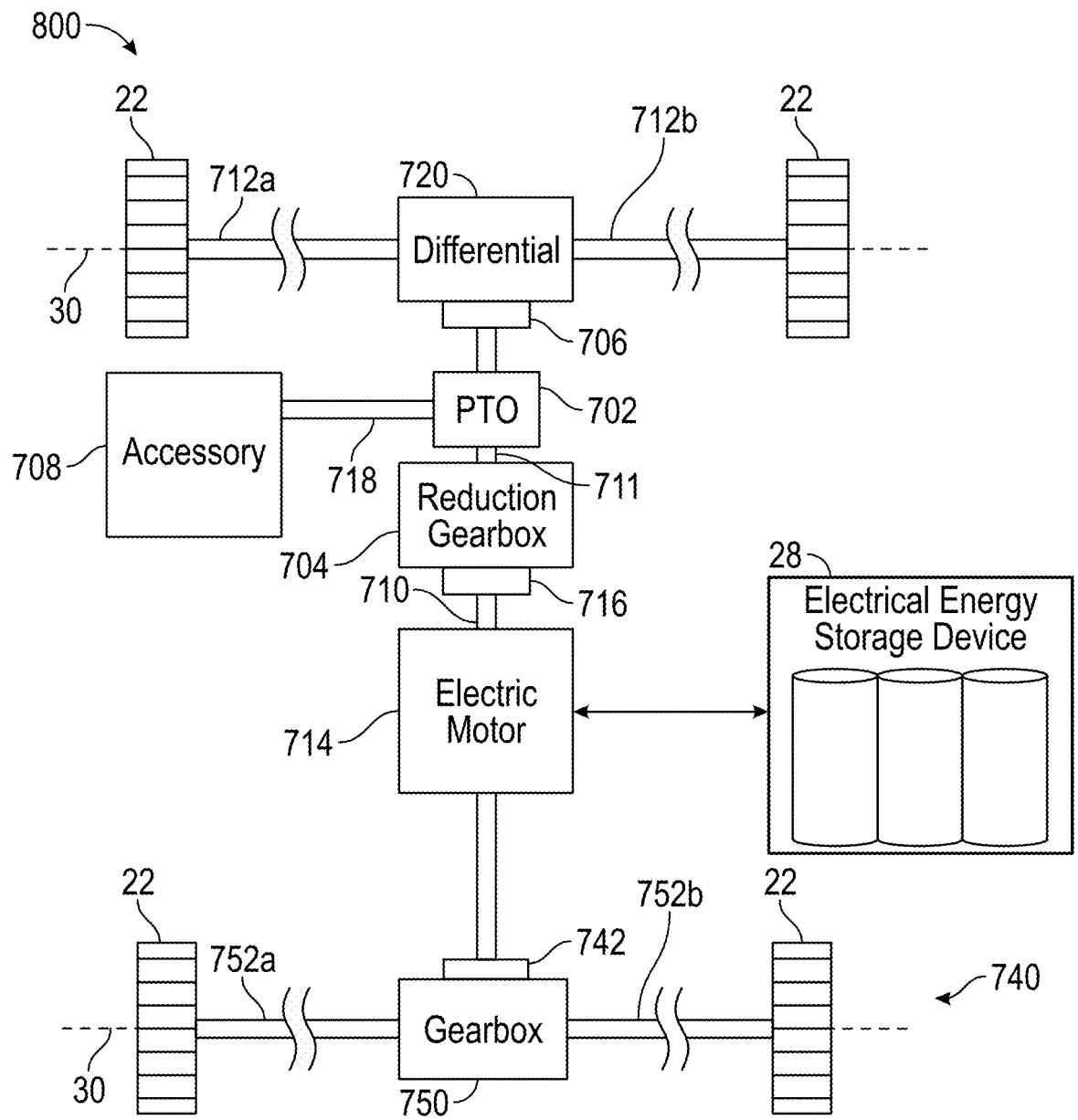
FIG. 6 is a block diagram of a drive system usable with the electric drivetrain of FIG. 2, according to an exemplary embodiment.

Referring still to FIG. 6, the memory 508 includes a mode selection manager 524 and a control signal generator 526. The mode selection manager 524 is configured to receive user inputs from the user interface 518. The user inputs may include a selection between various modes of operation (e.g., activation of an accessory system, etc.). In some embodiments, the user inputs can include an indication of whether an accessory system should be activated. For example, the user input may transition the commercial vehicle 10 between a neutral mode, a drive-only mode, an accessory-only mode, a drive-accessory hybrid mode, or an all-wheel drive mode.

The mode selection manager 524 may additionally or alternatively be configured to sensor data from the traction sensors 519. The traction sensors 519 may be configured to provide sensor data that is indicative of whether or not one or more of the wheels 22 is slipping. By way of example, the traction sensors 519 may include wheel speed sensors (e.g., optical encoders) that indicate a rotational speed of one or more of the wheels 22. The mode selection manager 524 may determine that a wheel 22 driven by an electric motor is slipping when the sensed wheel speed of the driven wheel 22 is greater than that of a wheel that is not driven. By way of another example, the traction sensors 519 include one or more sensors (e.g., a global positioning system, accelerometers, gyroscopic sensors, etc.) that indicate an orientation, position, velocity, and/or acceleration of the commercial vehicle 10 relative to a stationary object (e.g., the Earth). The mode selection manager 524 may determine that one or more wheels 22 are spinning when a wheel speed of the wheel 22 is inconsistent with the measured velocity of the vehicle. By way of example, the mode selection manager 524 may multiply the wheel speed of a wheel 22 by the circumference of the wheel to calculate a non-slipping linear speed of the wheel 22, and compare that non-slipping linear speed to the measured velocity of the vehicle.

The mode selection manager 524 may select a mode of operation for the commercial vehicle 10 based on whether or not the traction sensors 519 indicate that one or more wheels 22 are slipping. In response to a determination that one or more wheels 22 are slipping, the mode selection manager 524 may transition the commercial vehicle 10 into an all-wheel drive mode. In the all-wheel drive mode, the commercial vehicle 10 may supply power to drive all of the electric axles of the commercial vehicle 10. Additionally or alternatively, the commercial vehicle 10 may engage one or more clutches (e.g., the clutch 742) to couple additional wheels 22 to one or more electric motors (e.g., electric motors 314, 414, 714, or 204). In the all-wheel drive mode of operation, an increased number of wheels 22 are driven, improving traction performance (i.e., reducing wheel slippage) in low-traction conditions. The all-wheel drive mode may be specific configuration of the drive only mode or the drive-accessory hybrid modes.

When the commercial vehicle 10 is transitioned into the neutral mode, the mechanical energy output of the electric motors of the various electronic axles 510 may be disconnected or de-coupled from their corresponding wheels 22. In this way, commercial vehicle 10 is in a "neutral" mode and may be rolled, without backdriving the electric motors (e.g., electric motors 314, 414, 714, or 204). When the commercial vehicle 10 is transitioned into the drive-only mode, one or more of the electronic axles 510 are transitioned into a mode or state to provide mechanical energy to their corresponding wheels 22 without providing mechanical energy to drive an accessory (e.g., the accessory 520, the accessory 522, the accessory 408, the accessory 308, the accessory 708, etc.). In this way, the electronic axles 510 can be operated to transport the commercial vehicle 10 without driving the accessory.

When the commercial vehicle 10 is transitioned into the accessory-only mode, the electronic axles 510 can be transitioned into a mode so that one or more of the electronic axles are configured to output mechanical energy or torque to a corresponding accessory without driving the wheels 22 (e.g., by engaging the PTO 402, the PTO 302, or the PTO 702, without engaging the clutch 406, the clutch 306, the clutch 706, or the clutch 742). Such a mode may be used when commercial vehicle 10 is stationary (e.g., at a jobsite) but an accessory requires torque input for use.

When the commercial vehicle 10 is transitioned into the drive-accessory hybrid mode, the electronic axles 510 may both provide mechanical energy to the drive the wheels 22 and transport the commercial vehicle 10, as well as provide mechanical energy to drive a corresponding accessory (e.g., the accessory 520, the accessory 522, the accessory 408, the accessory 308, the accessory 708, etc.).

In some embodiments, the controller 502 is configured to transition the electronic axles 510 between their particular modes in order to transition commercial vehicle 10 between the various modes described herein. For example, when the commercial vehicle 10 is transitioned into the drive-accessory hybrid mode, one of the electronic axles 510 of the tandem 516 may be configured to drive its corresponding wheels 22 to drive or transport the commercial vehicle 10, while the other of the electronic axles 510 of the tandem 516 may be configured to drive its corresponding accessory. For example, the electronic axle 510b may be configured to drive its wheels 22 (e.g., by disengaging a PTO and engaging a clutch for the wheels 22), while the electronic axle 510a may be configured to drive its accessory 522. In this way, the drivetrain 200 may be configured to both drive the commercial vehicle 10 for transportation, in addition to driving an accessory device, apparatus, or system, even while commercial vehicle 10 is being transported.

Referring still to FIG. 6, the mode selection manager 524 may receive the user inputs and/or the sensor data, determine a mode to be selected, and provide the selected mode to the control signal generator 526. For example, if the user inputs indicate a request to both transport the commercial vehicle 10 as well as to use one of the accessory 520 or the accessory 522, the mode selection manager 524 can select the drive-accessory hybrid mode and can provide the control signal generator 526 with the selected mode. In another example, if the user inputs indicate a request to transport the commercial vehicle 10 without operation of one of the accessory 520 or the accessory 522, the mode selection manager 524 can select the drive-only mode. In some embodiments, the user inputs are a direct selection of a preferred mode, while in other embodiments, the user inputs are a request for particular functionality, and the mode selection manager 524 determines which mode can be used to achieve the requested functionality. In another example, if the sensor data indicates that one or more wheels 22 are slipping, the mode selection manager 524 may select the all-wheel drive mode.

The control signal generator 526 receives the selected mode from the mode selection manager 524, and generates and provides control signals to the first electronic axle 510a, the second electronic axle 510b, and/or the third electronic axle 510c. The control signals can be engagement or disengagement signals for any of a PTO 512a of first electronic axle 510a, a clutch 514a of first electronic axle 510a, a PTO 512b of the second electronic axle 510b, a clutch 514b of the second electronic axle 510, or a PTO 512c or clutch 514c of the third electronic axle 510c. The PTOs 512 may be any of the PTO 302, the PTO 402, or the PTO 602. The clutches 514 may be any of the clutch 306, the clutch 406, the clutch 416, the clutch 706, the clutch 716, or the clutch 742.

In some embodiments, the second electronic axle 510b is the electric axle 300, the electric axle 400, the electric axle 700, or part of the drive system 800. In some embodiments, third electronic axle 510c is the electric axle 300, the electric axle 400, the electric axle 700, or part of the drive system 800. For example, if the second electric axle 510b is the electric axle 300, then the PTO 512b is the PTO 302 and the clutch 514b is the clutch 306. Likewise, if the second electric axle 510b is the electric axle 400, then the PTO 512b is the PTO 402 and the clutch 514b is the clutch 406. More generally, the PTO 512 is configured to be transitioned into an engaged state so that mechanical energy generated by an electric motor of the electronic axle 510 is at least partially provided to the corresponding accessory (e.g., the accessory 520 or the accessory 522). Similarly, the clutch 514 is configured to be transitioned into an engaged state so that mechanical energy generated by the electric motor of the electronic axle is at least partially provided to the corresponding wheels 22 (e.g., through a gearbox or differential) or the wheels of another axle assembly (e.g., the axle assembly 740).

The control signal generator 526 facilitates transitioning of the commercial vehicle 10 or the drivetrain 200 between the various modes and operation of the commercial vehicle 10 or the drivetrain 200 while in the various modes. The control signal generator 526 can generate control signals for the PTOs 512 and/or the clutches 514 of the various electronic axles 510, and can also generate control signals for the electric motors of the various electronic axles 510.

In some embodiments, the electronic axle 510b and electronic axle 510c are configured to selectively engage or drive different accessories (e.g., the accessory 520 and the accessory 522, respectively). In other embodiments, the electronic axle 510b and the electronic axle 510c are configured to selectively engage or drive a same accessory (e.g., the accessory 520 and the accessory 522 are the same). The accessory may be a fluid system, a hydraulic system, an articulated arm, a compression system, an air system, a water pumping system, a compaction system, a lighting system, a generator system, a grabber arm, etc.

Process

Referring particularly to FIG. 7, a process 600 for operating a commercial vehicle with at least one electric axle is shown, according to some embodiments. The process 600 includes steps 602-616, some of which may be performed by the control system 500. In some embodiments, the process 600 can be performed so that an accessory of the commercial vehicle is operated or powered using mechanical energy that is provided by an electric axle of the commercial vehicle. The accessory can be powered or driven by one or more of the electric axles of the commercial vehicle, even while the commercial vehicle is driven to transport. In some embodiments, the process 600 can be performed so that an axle assembly of the commercial vehicle is operated or powered using mechanical energy that is provided by an electric axle of the commercial vehicle.

The process 600 includes providing a commercial vehicle with at least one electric axle (e.g., a first axle, a first electric axle, and a second electric axle) (step 602), according to some embodiments. In some embodiments, a first axle is a front axle that is positioned at a front of a chassis of the commercial vehicle. In some embodiments, the first axle is a passive axle that does not include an electric motor for actively generating mechanical energy to transport the commercial vehicle. In some embodiments, a first electric axle and a second electric axle form a tandem axle that is positioned at a rear of the commercial vehicle. In other embodiments, the tandem is not positioned at the rear of the commercial vehicle, but is positioned at the front of the commercial vehicle and the first axle is positioned at the rear of the commercial vehicle. In still other embodiments, the first axle, the first electric axle, and the second electric axle are positioned equal distances apart along a chassis of the commercial vehicle. In some embodiments, the first electric axle and the second electric axle include a corresponding electric motor that is configured to consume electrical energy and generate mechanical energy to drive wheels of the commercial vehicle. In some embodiments, at least one of the first electric axle and the second electric axle is configured to selectively engage a PTO to drive an accessory device, system, or apparatus of the commercial vehicle. In some embodiments, the commercial vehicle includes an electric axle that is selectively coupled to an axle assembly such that the axle assembly is selectively driven by the electric axle. By way of example, the electric axle and the axle assembly driven by the electric axle may be arranged as a tandem at a front or rear of the commercial vehicle.

The process 600 includes receiving a user input to drive the commercial vehicle using one or more of electric axles (step 604), according to some embodiments. In some embodiments, a first electric axle and/or a second electric axle are configured to drive wheels or tractive elements of the commercial vehicle. In some embodiments, during a driving operation, one or more electric axles are transitioned into a drive mode so that mechanical energy that is output or generated by the electric motors are provided to the wheels.

In some embodiments, step 604 is performed by the controller 502. The user input can be provided by a pedal (e.g., an accelerator pedal), a steering wheel, etc., or via any other user input devices (e.g., of the user interface 518).

The process 600 includes receiving a user input to drive an accessory using at least one of the electric axles (step 606), according to some embodiments. In some embodiments, the user input is received by controller 502 from a user interface (e.g., user interface 518). In some embodiments, the user input is a request to activate, operate, or use a particular system, sub-system, apparatus, etc., of the commercial vehicle. For example, if the accessory is a refuse vehicle arm, the user input may be obtained from a control panel where the user may control or request to use the refuse vehicle arm. In some embodiments, step 606 is performed by the controller 502.

The process 600 includes receiving sensor data (step 608) according to some embodiments. In some embodiments, sensor data related to wheel slip is received from one or more sensors (e.g., the traction sensors 519). The sensor data may indicate whether or not one or more wheels of the commercial vehicle are slipping. If one or more wheels of the commercial vehicle are slipping, it may be advantageous to drive additional wheels of the vehicle to improve traction and propel the commercial vehicle. Accordingly, a controller (e.g., the mode selection manager 524 of the controller 502) may determine that the commercial vehicle should be changed to an all-wheel drive mode in response to the sensor data indicating that one or more wheels are slipping.

The process 600 includes generating control signals for a power take off (PTO) and/or a clutch of at least one of the electric axles (step 610), according to some embodiments. In some embodiments, the control signals are generated by control signal generator 526 to transition the commercial vehicle between various modes of operation. For example, the different modes of operation can include a neutral mode, a drive-only mode, an accessory-only mode, or a drive-accessory hybrid mode. The drive-only mode and the drive-accessory hybrid mode may include an all-wheel drive mode in which multiple axles are driven and a partial wheel drive mode or two wheel drive mode in which a smaller subset of the axles are driven. In some embodiments, the control signals for the PTOs and/or the clutches of the electric axles transition the PTOs and/or the clutches of the electric axle between engaged and disengaged states. The control signals can be generated to transition the commercial vehicle (e.g., the first axle, the first electric axle, and the second electric axle) between the various modes of operation. In some embodiments, transitioning one or more of the electric axles between various modes, changes an overall mode of operation of the commercial vehicle.

The process 600 includes providing the control signals to the PTOs and/or the clutches of one or more electric axles to engage the PTO (e.g., an output driveshaft connected to a PTO) with an electric motor of the corresponding electric axle (step 612), according to some embodiments. In some embodiments, one or more electric axles each include a PTO that can selectively engage and/or receive mechanical energy output from the electric motor to drive a corresponding accessory. Step 612 can be performed by the control signal generator 526 and a PTO of one or more electric axles. In some embodiments, step 612 also includes providing control signals to a clutches of one or more electric axles to disengage drive axles of the corresponding electric axle, so that the electric motor does not drive the wheels of the axle, but rather only drives the accessory.

The process 600 includes driving the accessory through the PTO using the electric motor of at least one electric axle (step 612) and driving the commercial vehicle for transportation using at least one electric axle (step 614), according to some embodiments. In some embodiments, a first electric axle drives the accessory and a second electric axle propels the commercial vehicle. Steps 612 and 614 can be performed by the controller 502, or more particularly, by the control signal generator 526. In some embodiments, the accessory is driven by the electric motor of a first axle (or the second axle) through the PTO, and the wheels of a second axle are driven by the electric motor of the second axle (or the first axle) for transportation. In this way, the tandem formed by the first electric axle and the second electric axle can be used to both transport the commercial vehicle, and to drive an accessory of the commercial vehicle.

Advantageously, the systems and methods described herein facilitate using a tandem electric axle infrastructure to both drive a commercial vehicle for transportation, and to drive an accessory of the commercial vehicle. This reduces a need to install an additional electric motor for driving the accessory independently.

Configuration of Exemplary Embodiments

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A vehicle comprising:
a chassis; and
an electric axle coupled to the chassis, the electric axle comprising:
an electric motor;
a tractive element coupled to the electric motor and configured to be driven by the electric motor to propel the vehicle;
a power take off (PTO) shaft coupled to the electric motor;
a drive shaft coupling the tractive element to the electric motor; and
a housing coupled to the chassis and at least partially containing the electric motor, the drive shaft, and the PTO shaft.

2. The vehicle of claim 1, wherein the housing is removably coupled to the chassis such that the electric axle can be decoupled from the chassis without removing the electric motor, the drive shaft, or the PTO shaft from the housing.

3. The vehicle of claim 1, wherein the vehicle comprises an accessory coupled to the PTO shaft and configured to be driven by the electric motor.

4. The vehicle of claim 3, wherein the accessory includes at least one of a pump, a compressor, a generator, or an actuator.

5. The vehicle of claim 3, wherein the electric axle further comprises a clutch having (a) an engaged state in which the clutch couples the accessory to the electric motor and (b) a disengaged state in which the electric motor is disengaged from the accessory.

6. The vehicle of claim 1, wherein the tractive element is a first tractive element, and wherein the vehicle comprises an axle assembly including a second tractive element coupled to the PTO shaft and configured to be driven by the electric motor to propel the vehicle.

7. The vehicle of claim 6, wherein the electric axle further comprises a clutch having (a) an engaged state in which the clutch couples the axle assembly to the electric motor and (b) a disengaged state in which the electric motor is disengaged from the axle assembly.

8. The vehicle of claim 7, further comprising:
a sensor configured to detect slippage of the first tractive element; and
a controller operatively coupled to the sensor and configured to generate and provide control signals to the clutch in response to an indication from the sensor that the first tractive element is slipping, the control signals causing the clutch to enter the engaged state to couple the axle assembly to the electric motor.

9. The vehicle of claim 1, wherein the PTO shaft is a first PTO shaft, and wherein the electric axle further comprises:
a second PTO shaft;
a first clutch positioned to selectively engage the first PTO shaft with the electric motor; and
a second clutch positioned to selectively engage the second PTO shaft with the electric motor.

10. The vehicle of claim 9, further comprising a controller configured to generate and provide control signals to the first clutch and the second clutch to reconfigure the vehicle between:
a first mode of operation in which the first PTO shaft is engaged with the electric motor and the second PTO shaft is disengaged from the electric motor;
a second mode of operation in which the first PTO shaft is disengaged from the electric motor and the second PTO shaft is engaged with the electric motor; and
a third mode of operation in which the first PTO shaft and the second PTO shaft are both engaged with the electric motor.

11. An electric axle for a vehicle, the electric axle comprising:
a housing configured to be coupled to a chassis of the vehicle;
a tractive element rotatably coupled to the housing;
a power take off (PTO) rotatably coupled to the housing;
an electric motor coupled to the housing and configured to drive the tractive element and the PTO;
a clutch selectively coupling the electric motor to the PTO;
a sensor configured to detect slippage of the tractive element; and
a controller operatively coupled to the sensor and configured to engage the clutch in response to an indication from the sensor that the tractive element is slipping.

12. The electric axle of claim 11, wherein the PTO is a first PTO and the clutch is a first clutch, and wherein the electric axle further comprises:
a second PTO; and
a second clutch positioned to selectively engage the second PTO with the electric motor.

13. The electric axle of claim 12, wherein the controller is configured to generate and provide control signals to the first clutch and the second clutch to reconfigure the electric axle between:
a first mode of operation in which the first clutch is engaged and the second clutch is disengaged;
a second mode of operation in which the first clutch is disengaged and the second clutch is engaged; and
a third mode of operation in which the first clutch and the second clutch are both engaged.

14. The electric axle of claim 11, wherein the PTO is configured to be coupled to an axle assembly.

15. An electric axle for a vehicle, the electric axle comprising:
a housing configured to be coupled to a chassis of the vehicle;
a tractive element rotatably coupled to the housing;
a first power take off (PTO) rotatably coupled to the housing;
an electric motor coupled to the housing and configured to drive the tractive element and the first PTO;
a first clutch selectively coupling the electric motor to the first PTO;
a second PTO;
a second clutch positioned to selectively engage the second PTO with the electric motor; and
a controller configured to generate and provide control signals to the first clutch and the second clutch to reconfigure the electric axle between:
a first mode of operation in which the first clutch is engaged and the second clutch is disengaged;
a second mode of operation in which the first clutch is disengaged and the second clutch is engaged; and
a third mode of operation in which the first clutch and the second clutch are both engaged.

16. The electric axle of claim 15, wherein the first clutch is configured to selectively couple the electric motor to the tractive element.

17. The electric axle of claim 15, wherein the first PTO is configured to be coupled to at least one of an accessory or an axle assembly.

* * * * *